(12) United States Patent
Shao et al.

(10) Patent No.: US 11,908,127 B2
(45) Date of Patent: Feb. 20, 2024

(54) INTERNET OF THINGS SYSTEMS FOR INDUSTRIAL DATA PROCESSING, CONTROL METHODS, AND STORAGE MEDIUM THEREOF

(71) Applicant: CHENGDU QINCHUAN IOT TECHNOLOGY CO., LTD., Sichuan (CN)

(72) Inventors: Zehua Shao, Chengdu (CN); Bin Liu, Chengdu (CN); Lei Zhang, Chengdu (CN); Yong Li, Chengdu (CN); Xiaojun Wei, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/184,645

(22) Filed: Mar. 15, 2023

(65) Prior Publication Data

US 2023/0237645 A1   Jul. 27, 2023

Related U.S. Application Data

(63) Continuation of application No. 18/048,024, filed on Oct. 19, 2022, now Pat. No. 11,640,660.

(30) Foreign Application Priority Data

Aug. 17, 2022   (CN) .......................... 202210983679.5

(51) Int. Cl.
   *G01N 21/88*   (2006.01)
   *G06T 7/00*    (2017.01)

(52) U.S. Cl.
   CPC .................................. *G06T 7/001* (2013.01)

(58) Field of Classification Search
   CPC ........... G06T 7/246; G06T 2207/10016; G06T 2207/30244; G06T 7/0012;
   (Continued)

(56) References Cited

U.S. PATENT DOCUMENTS

| 11,640,660 | B2 * | 5/2023 | Shao ....................... G06T 7/001 |
| | | | 382/141 |
| 2017/0336858 | A1 * | 11/2017 | Lee ......................... H04N 23/64 |

(Continued)

FOREIGN PATENT DOCUMENTS

| CN | 105991946 A | 10/2016 |
| CN | 111738960 A | 10/2020 |

(Continued)

OTHER PUBLICATIONS

First Office Action in Chinese Application No. 202210983679.5 dated Sep. 23, 2022, 12 pages.

(Continued)

*Primary Examiner* — Quan M Hua
(74) *Attorney, Agent, or Firm* — METIS IP LLC (57) ABSTRACT

The present disclosure discloses an Internet of Things (IoT) system for industrial data processing, a control method, and a storage medium, and provides a technical solution for a timely adjustment of production line parameters according to image information generated during a machine vision data collection on the production line. Through a difference of the image information corresponding to different process operations, a processing situation of different process operations may be obtained, so that more accurate adjustment of the production line parameter may be achieved without increasing the system complexity, thereby effectively reducing a development cost of the IoT, and increasing accuracy of the intelligent manufacturing control.

17 Claims, 4 Drawing Sheets

(58) Field of Classification Search
CPC ......... G06T 2207/20021; G06T 3/4038; G06T 2207/10024; G06T 2207/20081; G06T 7/55; G06T 7/73; G06T 7/80; G06T 2207/20016; G06T 2207/30241; G06T 2207/10012; G06T 2207/20084; G06T 2207/20228; G06T 2207/30252; G06T 7/0002; G06T 7/20; G01K 13/20; G06F 18/00; G06F 16/71; G06F 11/1641; G06F 11/26; G06F 11/263; G06F 11/3065; G06F 16/634; G06F 16/683; G06F 16/785; G06F 16/75
See application file for complete search history.

(56) References Cited

U.S. PATENT DOCUMENTS

| | | | |
|---|---|---|---|
| 2019/0234972 A1* | 8/2019 | Oh | H04W 4/70 |
| 2020/0211364 A1 | 7/2020 | Kasiviswanathan | |
| 2020/0236343 A1 | 7/2020 | Holzer et al. | |
| 2021/0295491 A1 | 9/2021 | Hyatt | |
| 2022/0036533 A1 | 2/2022 | Xiao et al. | |
| 2022/0156910 A1 | 5/2022 | Tan et al. | |

FOREIGN PATENT DOCUMENTS

| | | |
|---|---|---|
| CN | 111753005 A | 10/2020 |
| CN | 112132125 A | 12/2020 |
| CN | 112241934 A | 1/2021 |
| CN | 112257759 A | 1/2021 |
| CN | 113535379 A | 10/2021 |
| CN | 113744332 A | 12/2021 |
| CN | 114414157 A | 4/2022 |
| CN | 114862860 A | 8/2022 |
| JP | 2019049978 A | 3/2019 |
| KR | 20200029646 A | 3/2020 |

OTHER PUBLICATIONS

Xie, Yuanmang, Key Technologies of Intelligent Image Processing for Urban Transportation, China Doctoral Dissertations Full-text Database, 2022, 123 pages.

Fan, Jiawei, Research on Multi-Sensor Data Classification and Object Detection Method, China Master's Theses Full-Text Database, 2022, 109 pages.

Furqan Alam et al., Analysis of Eight Data Mining Algorithms for Smarter Internet of Things (IoT), Procedia Computer Science, 437-442, 2016.

* cited by examiner

| | |
|---|---|
| The sensing network sub-platforms receive image information of a product when a process operation of a production line ends as a first image data; each of the sensing network sub-platforms receiving the first image data corresponding to different process operation | S1 |
| The sensing network sub-platforms identify first feature information of the first image data, and correct, according to the first feature information and baseline feature information, the first image data to form second image data | S2 |
| The sensing network sub-platforms send the second image data to the sensing network general platform | S3 |
| The sensing network general platform receives the second image data, and sort the second image data according to the process operation of the production line to form a first image database | S4 |
| The sensing network general platform sends the first image database to the management platform | S5 |
| The management platform identifies a difference between adjacent second image data in the first image database as a first image difference data | S6 |
| The management platform generates a control parameter of a production line device according to the first image difference data, and corrects the control parameter as a first parameter, and issues the first parameter to the production line device through the sensing network platform | S7 |
| The management platform sends the first image database and the first image difference data to a user platform for display through the service platform | S8 |

INTERNET OF THINGS SYSTEMS FOR INDUSTRIAL DATA PROCESSING, CONTROL METHODS, AND STORAGE MEDIUM THEREOF

CROSS-REFERENCE TO RELATED APPLICATION

This application is a continuation of U.S. application Ser. No. 18/048,024, filed on Oct. 19, 2022, which claims priority of Chinese Patent Application No. 202210983679.5, filed on Aug. 17, 2022, the contents of which are entirely incorporated herein by reference.

TECHNICAL FIELD

The present disclosure generally involves the field of industrial Internet of Things technology, and specifically involves an Internet of Things (IoT) system for industrial data processing, control methods, and storage medium thereof.

BACKGROUND

A machine vision may be a technique and approach in industry to provide image-based automated inspection and analysis for applications such as automated inspection, process control, and robotic guidance, etc. The machine vision technology may be a very important link on an industrial IoT. At present, the machine vision may be mainly applied in scenarios that require material adjustment, such as a material grabbing, placement, and alignment. For the industrial IoT, an intelligent control mainly depends on feedback of a parameter on a production line. The intelligent control does not make full use of the data generated by the machine vision. Instead, too many sensors may increase a system complexity.

SUMMARY

To at least overcome the above deficiencies in the existing technology, the purpose of the present disclosure is to provide an IoT system for industrial data processing, control methods and storage medium.

In the first aspect, the embodiment of the present disclosure provides the IoT system for industrial data processing, including: a service platform, a management platform, and a sensing network platform that interact in turn. The sensing network platform includes a sensing network general platform and a plurality of sensing network sub-platforms.

The sensing network sub-platforms are configured to receive image information of a product when a process operation of a production line ends as a first image data; each of the sensing network sub-platforms receiving the first image data corresponding to different process operation; identify first feature information of the first image data, and correct, according to the first feature information and baseline feature information, the first image data to form second image data; and send the second image data to the sensing network general platform.

The sensing network general platform is configured to receive the second image data, and sort the second image data according to the process operation of the production line to form a first image database; and send the first image database to the management platform.

The service platform is configured to calculate a difference of corresponding data in the first image difference data of different products as a second image difference data, including: determining a time series based on the first image difference data, wherein the time series is a series of generation time of each product arranged in an order of time; performing a stationarity test on the time series; calculating a statistical data of the time series based on a result of the stationarity test; determining the second image difference data; and sending the second image difference data to the management platform.

The management platform is configured to identify a difference between adjacent second image data in the first image database as a first image difference data; generate, according to the first image difference data, a control parameter of a production line device, correct the control parameter as a first parameter, issue the first parameter to the production line device through the sensing network platform; and send the first image database and the first image difference data to the user platform for display through the service platform.

In existing technologies, the feed control of the intelligent adjustment of the production line is mainly based on the data detected by the relevant sensor on the production line. However, in production practice, in order to obtain more accurate production line feedback, more sensors are needed. However, increasing the number of sensors may not only increase the complexity of the system, but also sometimes cause the subsequent data processing overfitting, which reduces the control accuracy.

When the embodiments of the present disclosure are implemented, a technical solution for a timely adjustment of production line parameters according to image information generated during a machine vision data collection on the production line may be provided. Through the difference of the image information corresponding to different process operations, a processing situation of different process operations may be obtained, so that more accurate adjustment of production line parameter may be achieved without increasing the system complexity, thereby effectively reducing a development cost of the industrial IoT, and increasing accuracy of intelligent manufacturing control.

In the embodiment of the present disclosure, the sensing network general platform and the sensing network sub-platforms may be both configured as gateway servers, the service platform may be configured as a first server, and the management platform may be configured as a second server. The first image data received by the sensing network sub-platforms may usually be the image data used by the machine vision obtained when transferring, alignment, or other operations are performed at the end of a process operation. To improve efficiency of an identification and correction, each sensing network sub-platform receives and processes the first image data corresponding to different process operations. The processing process may include identifying first feature information of the first image data, and performing an image correction through baseline feature information preset in the sensing network sub-platform. The first feature information identified by each sensing network sub-platform may be the same or may be different, the embodiments of the present disclosure don't limit this. However, it is necessary that the second image data formed after correction by the same sensor network sub-platform has the same product size and orientation.

In the embodiment of the present disclosure, the sensing network general platform may sort the process operations of the production line when receiving the second image data. A sorting approach may be performed according to ID of a shooting device of the second image data, or may be performed according to the communication ID of the sensing network sub-platform, and the embodiment of the present disclosure doesn't limit this. An amount of calculation for sorting may be small, and an ordinary intelligent gateway device may be fully capable of doing that.

In the embodiment of the present disclosure, the management platform may be the most important platform for parameter processing, the management platform needs to identify a difference between the adjacent second image data in the first image database. Since the sensing network general platform generates the first image database according to a sort of the process operations of the production line, the management platform may obtain a change produced by any product at any processing step after identifying the difference, and the change indicates the production process of the processing step. Through the detection of the production process, the control parameter of the production line may be corrected. At the same time, these images may further be displayed to the user platform through the service platform.

In the second aspect, the embodiment of the present disclosure provides a control method of an IoT for industrial data processing. The method may be applied to the service platform, the management platform, and the sensing network platform that interacts in turn. The sensing network platform includes a sensing network general platform and a plurality of sensing network sub-platforms.

The method comprising: the sensing network sub-platforms receiving image information of a product when a process operation of a production line ends as a first image data; each of the sensing network sub-platforms receiving the first image data corresponding to different process operation; the sensing network sub-platforms identifying first feature information of the first image data, and correcting, according to the first feature information and baseline feature information, the first image data to form second image data; the sensing network sub-platforms sending the second image data to the sensing network general platform; the sensing network general platform receiving the second image data, and sorting the second image data according to the process operation of the production line to form a first image database; the sensing network general platform sending the first image database to the management platform; the service platform calculating a difference of corresponding data in the first image difference data of different products as a second image difference data, including: determining a time series based on the first image difference data, wherein the time series is a series of generation time of each product arranged in an order of time; performing a stationarity test on the time series; calculating a statistical data of the time series based on a result of the stationarity test; determining the second image difference data; and sending the second image difference data to the management platform; the management platform identifying a difference between adjacent second image data in the first image database as a first image difference data; the management platform generating, according to the first image difference data, the control parameter of a production line device, and correcting the control parameter as a first parameter, and issuing the first parameter to the production line device through the sensing network platform; and the management platform sending the first image database and the first image difference data to the user platform for display through the service platform.

One of the embodiments of the present disclosure provides a non-transitory computer-readable storage medium storing computer instructions, when reading the computer instructions in the storage medium, a computer implements the control method of an IoT for industrial data processing.

Compared with the existing technology, the present disclosure has the following advantages and beneficial effects.

The present disclosure provides a technical solution for a timely adjustment of production line parameters according to image information generated during a machine vision data collection on the production line based on the industrial Internet of Things and control methods based on machine visual detection. Through the difference of the image information corresponding to different process operations, a processing situation of different process operations may be obtained, so that more accurate adjustment of production line parameter may be achieved without increasing the system complexity, thereby effectively reducing a development cost of the industrial IoT, and increasing accuracy of intelligent manufacturing control.

BRIEF DESCRIPTION OF THE DRAWINGS

The exemplary embodiments of the present disclosure are described in detail with reference to the drawings. These embodiments are non-limiting exemplary embodiments. In the drawings.

DETAILED DESCRIPTION

To illustrate technical solutions of the embodiments of the present disclosure, a brief introduction regarding the drawings used to describe the embodiments is provided below. Obviously, the drawings described below are merely some examples or embodiments of the present disclosure. Those having ordinary skills in the art, without further creative efforts, may apply the present disclosure to other similar scenarios according to these drawings. It should be understood that the exemplary embodiments are provided merely for better comprehension and application of the present disclosure by those skilled in the art, and not intended to limit the scope of the present disclosure. Unless obvious according to the context or illustrated specifically, the same numeral in the drawings refers to the same structure or operation.

In addition, the embodiments described are only a part of the embodiments of the present disclosure instead of all embodiments. The components of the embodiments described and shown in the drawings here are usually arranged and designed by various configurations. Therefore, the detailed description of the embodiments of the present disclosure provided in the drawings below does not mean to limit the scope of the present disclosure that requires protection, but only indicate the selected embodiments of the present disclosure. Based on the embodiments of the present disclosure, all other embodiments obtained by those skilled in the art under the premise of not making creative labor belong to the scope of the present disclosure that requires protection.

Figure 1:
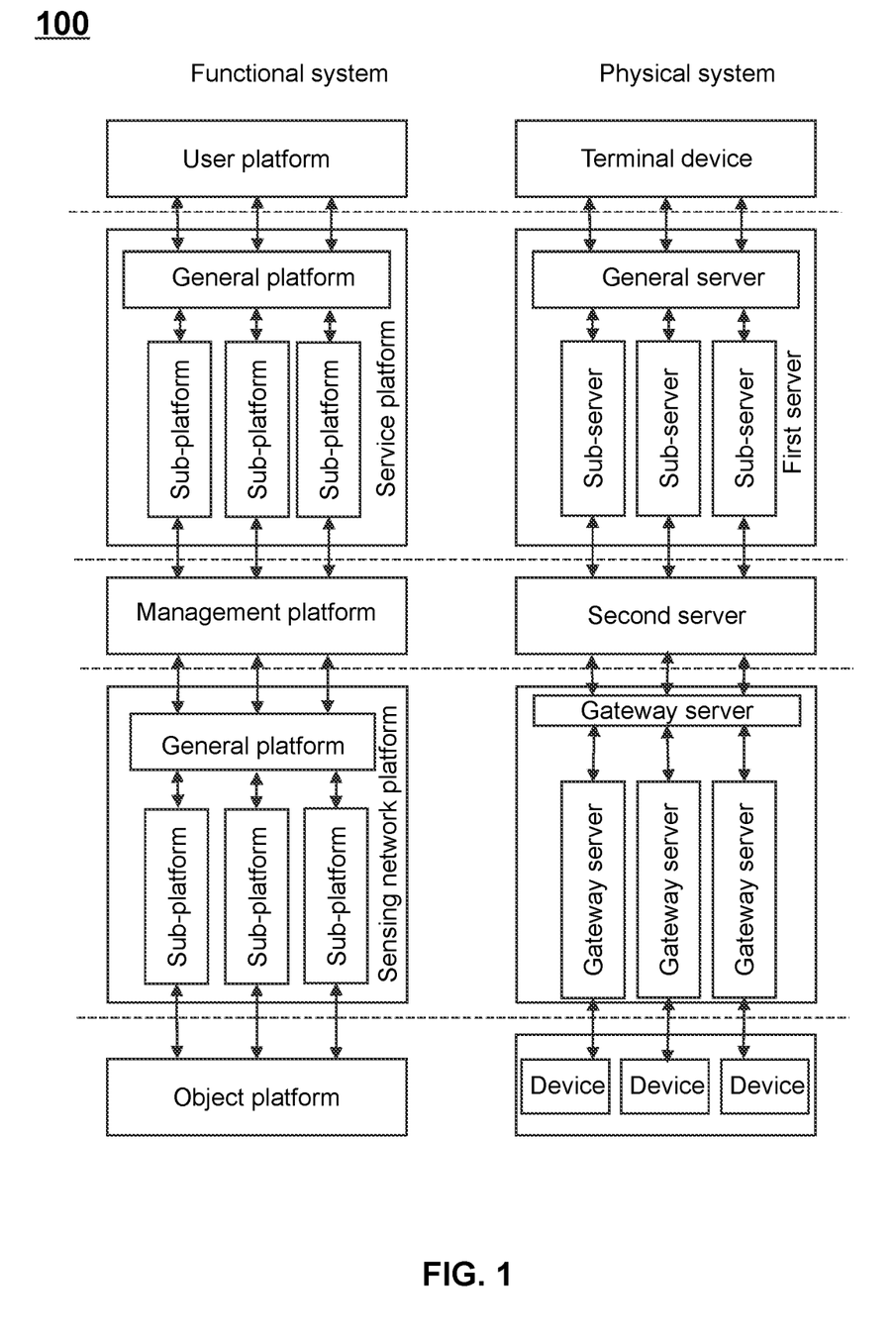
FIG. 1 is a schematic diagram illustrating structure of a system according to some embodiments of the present disclosure.

To facilitate the explanation of the above industrial IoT based on a machine vision detection, please refer to FIG. 1, FIG. 1 provides a schematic diagram of a communication structure of the industrial IoT based on a machine vision detection disclosed by the embodiments of the present disclosure. The industrial IoT based on a machine vision detection may include: a service platform, a management platform, and a sensing network platform that interact in turn. The service platform further interacts with a user platform, which is used as a user terminal. The sensing network platform further interacts with an object platform, which is used as a production line, the sensing network platform includes a sensing network general platform and a plurality of sensing network sub-platforms.

The sensing network sub-platforms may be configured to receive image information of the product when a process operation of the production line ends and take the image information as first image data; each sensing network sub-platform receiving the first image data corresponding to a different process operation; identify first feature information of the first image data, and correct the first image data to form second image data according to the first feature information and baseline feature information; and send the second image data to the sensing network general platform.

The sensing network general platform may be configured to receive the second image data, and sort the second image data in accordance with the production line process operations to form a first image database; and send the first image database to the management platform.

The management platform may be configured to identify a difference between the adjacent second image data in a first image database and take the different as first image difference data; generate, according to the first image difference data, a control parameter of a production line device, correct the control parameter of the production line device, and take the corrected control parameter as a first parameter, and issue a first parameter through the sensing network platform to the production line device; and send the first image database and the first image difference data to the user platform for display through the service platform.

In an existing technology, a feedback control of the intelligent adjustment of the production line may be mainly performed based on the data detected by the relevant sensor on the production line. However, in a production practice, more sensors are needed to obtain more accurate production line feedback. However, increasing the number of sensors will not only increase the complexity of the system, but also sometimes causes overfitting in subsequent data processing, which reduces control accuracy.

When the embodiments of the present disclosure are implemented, a technical solution for a timely adjustment of production line parameters according to image information generated during a machine vision data collection on the production line may be provided. Through the difference of the image information corresponding to different process operations, a processing situation of different process operations may be obtained, so that more accurate adjustment of the production line parameter may be achieved without increasing the system complexity, thereby effectively reducing a development cost of the Industrial IoT, and increasing accuracy of intelligent manufacturing control.

In the embodiment of the present disclosure, the sensing network general platform and the sensing network sub-platforms may be both configured as gateway servers, the service platform may be configured as a first server, and the management platform may be configured as a second server. The first image data received by the sensing network sub-platform may usually be the image data used by the machine vision obtained when transferring, alignment, or other operations are performed at the end of a process operation. To improve efficiency of an identification and correction, each sensing network sub-platform receives and processes the first image data corresponding to different process operations. The processing process may include identifying first feature information of the first image data, and performing an image correction through baseline feature information preset in the sensing network sub-platform. The first feature information identified by each sensing network sub-platform may be the same or may be different, the embodiments of the present disclosure don't limit this. However, it is necessary that the second image data formed after correction by the same sensor network sub-platform has the same product size and orientation.

In the embodiment of the present disclosure, the sensing network general platform may sort the process operations of the production line when receiving the second image data. A sorting approach may be performed according to ID of a shooting device of the second image data, or may be performed according to the communication ID of the sensing network sub-platform, and the embodiment of the present disclosure doesn't limit this. An amount of calculation for sorting may be small, and an ordinary intelligent gateway device may be fully capable of doing that.

In the embodiment of the present disclosure, the management platform may be the most important platform for parameter processing, the management platform needs to identify a difference between the adjacent second image data in the first image database. Since the sensing network general platform generates the first image database according to a sort of the process operations of the production line, the management platform may obtain a change produced by any product at any processing step after identifying the difference, and the change indicates the production process of the processing step. Through the detection of the production process, the control parameter of the production line may be corrected. At the same time, these images may further be displayed to the user platform through the service platform.

In a possible implementation, the service platform includes a service general platform and a plurality of service sub-platforms.

The service sub-platform may be configured to receive the first image difference data; each service sub-platform receiving the first image difference data corresponding to different products of a same production line; and transmit all the first image difference data to the service general-platform.

The service general platform is configured to calculate a difference of corresponding data in the first image difference data of different products as a second image difference data; and send the second image difference data to the management platform.

The management platform is configured to correct, according to the second image difference data, the control parameter to form the first parameter.

When the embodiment of the present disclosure is implemented, controlling the production parameter of the production line is not only to consider a processing situation of the product, but also consider a stability of processed product. Therefore, in the embodiments of the present disclosure, the first image difference data of different products on the same production line may be received through the service sub-platform, and a comparison may be performed between the first image difference data through the service general platform. When the same production line produces the same product, different products on the same production line refer to different product individuals of the same product. The difference of corresponding data in the first image difference data calculated by the service general platform refers to a difference data generated by different products in the same process operation.

Exemplarily, there may be a continuous process operation A, process operation B, and process operation C on the production line. At this time, a product A is photographed through the process operation A to obtain an image AA, then the product A is photographed through the process operation B to obtain an image AB, and then the product A is photographed through the process operation C to obtain an image AC. A product B is photographed through the process operation A to obtain an image BA, then the product B is photographed through the process operation B to obtain an image BB, and then the product B is photographed through the process operation C to obtain an image BC. Then the first image difference data corresponding to the product A may be an image A1 and an image A2. The image A1 may be a non-calculating result performed by the image AB and the image AA. The image A2 may be a non-calculating result performed by the image AC and the image AB. The first image difference data corresponding to the product B may be an image B1 and an image B2. The image B1 may be a non-calculating result performed by the image BB and the image BA. The image B2 may be a non-calculating result performed by the image BC and the image BB. At this time, the difference of the corresponding data in the first image difference data may be the difference between the image A1 and the image B1, and the difference between the image A2 and the image B2.

The difference data generated in the same process operation of different products indicates the stability of the process operation, that is, the state of the product processed under the same production parameter. Therefore, in the embodiment of the present disclosure, the management platform may perform correction on the control parameter through the second image difference data, which may maintain the stability of the production line after issuing a corrected control parameter.

In some embodiments, the service general platform may further be configured to determine a time series based on the first image difference data. The time series may be a series of generation time of each product arranged in an order of time. A stationarity test may be performed on the time series to determine whether the time series is a stable series. In response to a determination that the time series is a stable series, a first statistical data of the time series may be calculated, and determined as the second image difference data. The first statistical data includes at least one of a sample moment and an autocovariance. In response to a determination that the time series is not a stable series, a second statistical data of the time series may be calculated, and determined as the second image difference data. The second statistical data includes at least one of the sample moment and the autocovariance.

In some embodiments, the service general platform may further be configured to segment the time series and obtain at least one segmented time series, determine at least one second statistical data based on the at least one segmented time series, and integrate the at least one second statistical data to determine the second image difference data. The at least one second statistical data may be the at least one second statistical data corresponding to each segmented time series of the at least one segmented time series.

In one possible implementation, the management platform may be further configured to compare the first image difference data and baseline image difference data configured on the management platform to generate a third image difference data; input the third image difference data to an inversion model to generate the control parameter, and input the second image difference data to the inversion model to generate a second parameter; the input data of the inversion model may be the image difference data, and output data of the inversion model may be the production line parameter; and calculate a mean value of the control parameter and the second parameter to form the first parameter.

When the embodiment of the present disclosure is implemented, the production line parameter may be calculated by a preset inversion model. The inversion model may be trained through a sample. It should be understood that the technology of model training through a sample in the existing technology is very mature, and no matter what model is adopted, it should be within the protection range of the embodiments of the present disclosure. In the embodiment of the present disclosure, to reduce a calculation amount of the management platform, a baseline image difference data may be set up, so that the calculation may be respectively performed on the third image difference data and the second image difference data through only one inversion model, which effectively reduces model reading time of the management platform. In the embodiments of the present disclosure, the control parameter calculated through the third image difference data and the second parameter calculated through the data of the second image difference data need to be combined to generate the first parameter for issuing. Specifically, the first parameter may be generated by a mean value calculation method. In an operation process of the production line, the first parameter may be iterated and corrected. In the case of meeting a manufacturing technique requirement, the production process of the processing line may be stabilized as much as possible. It should be understood that the calculation of the mean value of the control parameter and the second parameter mentioned in the embodiment of the present disclosure may be the mean value of the same parameter.

In some embodiments, the inversion model includes at least one of an inversion layer, a parameter fusion layer, and a difference prediction layer. The inversion model may be a machine learning model. The management platform may further be configured to process the third image difference data based on the inversion layer to generate the control parameter, process the second image difference data based on the inversion layer to generate the second parameter, fuse the control parameter and the second parameter based on the parameter fusion layer to determine the first parameter, and process the first parameter based on the difference prediction layer to obtain a predicted third image difference data and/or a predicted second image difference data.

In some embodiments, a fusion weight of the control parameter and the second parameter in the parameter fusion layer may be related to an average proportion of preselected pixels in downstream image data.

In one possible implementation, the sensing network sub-platform may further be configured to zoom and rotate the first feature information to be fully aligned with the baseline feature information, record data corresponding to the zooming and rotation as processing data; and correct the first image data according to the processing data to form the second image data.

In one possible implementation, the management platform may further be configured to take image data at an upstream of the production line in the adjacent second image data as upstream image data, and image data at a downstream of the production line in the adjacent second image data as downstream image data; obtain edge data in the upstream image data as upper edge data, and obtain the edge data in the downstream image data as lower edge data; filter out an edge that does not exist in the upper edge data from the lower edge data as a difference edge; select a pixel whose a pixel value difference with pixel value of the upstream image data is greater than a preset value from the downstream image data as a preselected pixel, and filter out a pixel related to the difference edge from the preselected pixel to form the first image difference data. The pixel related to the difference edge refers to the pixel located within a closed difference edge or between the difference edge and a graphic boundary.

When the embodiment of the present disclosure is implemented, a more specific approach for obtaining difference data may be provided. In the production practice, the image applied by the machine vision lacks depth of field information, and lighting information of the image at different locations may be further different. To reduce an impact of the above information on the calculation of the difference data, an approach of a comprehensive identification of edge and difference pixel may be adopted. As an edge recognition is not affected by a difference of lighting, the identification of the difference edge may be generally more accurate, and combined with portions of image identified by the pixel value, the specific first image difference data may be determined, which effectively improves the accuracy of the identification.

Figure 2:
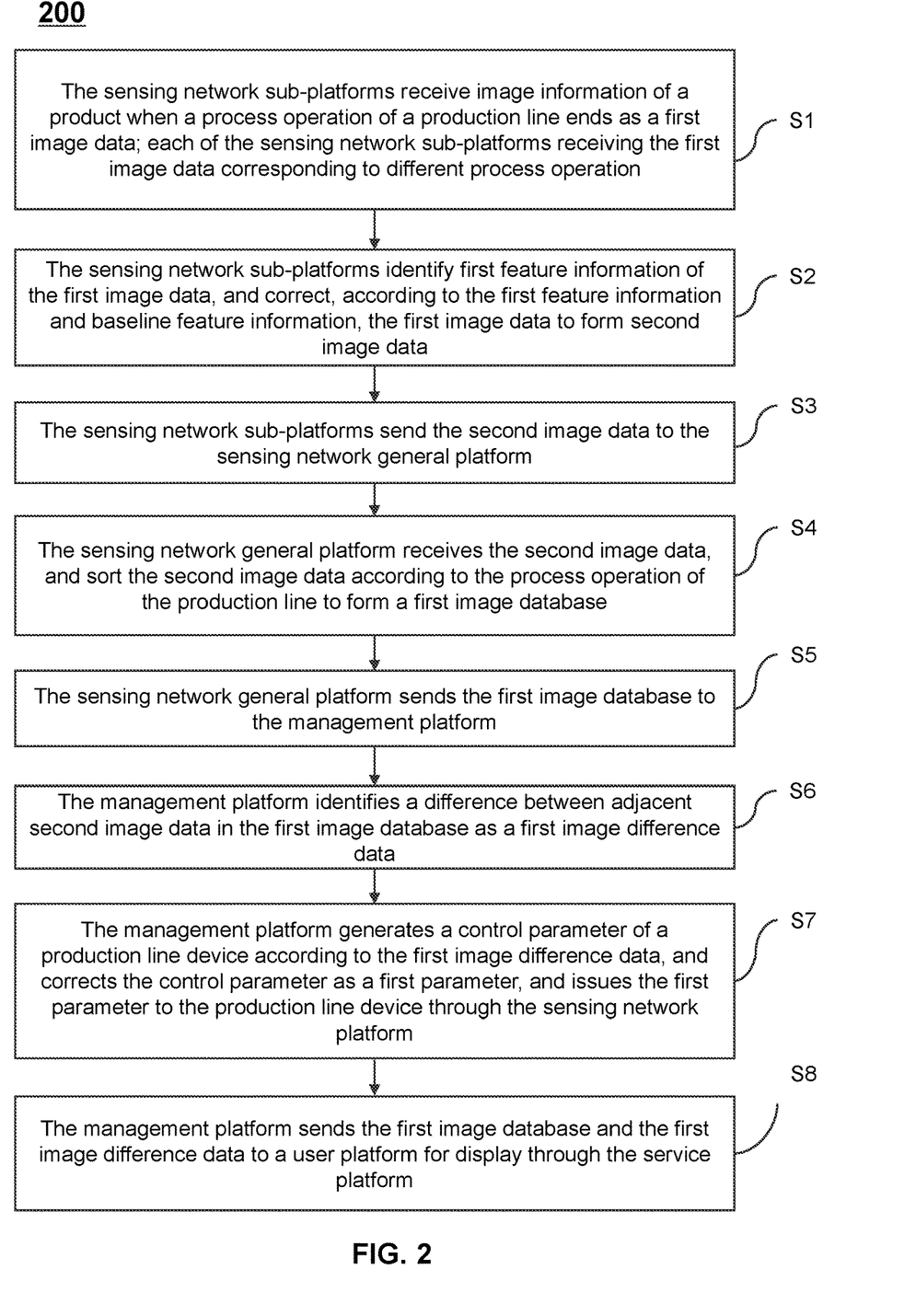
FIG. 2 is a schematic diagram illustrating operations of a method according to some embodiments of the present disclosure.

On the basis of the above, please refer to FIG. 2, FIG. 2 is a flowchart illustrating control method for the industrial IoT based on machine visual detection according to some embodiments of the present disclosure. The method may be applied in the industrial IoT based on machine visual detection shown in FIG. 1. Further, the method may include the contents described in the following operations S1-S8.

S1: the sensing network sub-platforms receive image information of a product when a process operation of a production line ends as a first image data; each of the sensing network sub-platforms receiving the first image data corresponding to different process operation.

S2: the sensing network sub-platforms identify first feature information of the first image data, and correct, according to the first feature information and baseline feature information, the first image data to form second image data.

S3: the sensing network sub-platforms send the second image data to the sensing network general platform.

S4: the sensing network general platform receives the second image data, and sort the second image data according to the process operation of the production line to form a first image database.

S5: the sensing network general platform sends the first image database to the management platform.

S6: the management platform identifies a difference between adjacent second image data in the first image database as a first image difference data.

S7: the management platform generates a control parameter of a production line device according to the first image difference data, and corrects the control parameter as a first parameter, and issues the first parameter to the production line device through the sensing network platform.

S8: the management platform sends the first image database and the first image difference data to a user platform for display through the service platform.

In a possible implementation, the service platform includes a service general platform and a plurality of service sub-platforms.

The method further includes the service sub-platforms receiving the first image difference data; each service sub-platform receiving the first image difference data corresponding to different products of a same production line; the service sub-platforms transmitting all the first image difference data to the service general-platform; the service general-platform calculating a difference of corresponding data in the first image difference data of different products as a second image difference data; the service general-platform sending the second image difference data to the management platform; and the management platform correcting the control parameter to form the first parameter according to the second image difference data.

In a possible implementation, the management platform compares the first image difference data and baseline image difference data configured on the management platform to generate a third image difference data.

The management platform inputs the third image difference data to an inversion model to generate the control parameter, and input the second image difference data to the inversion model to generate a second parameter; the input data of the inversion model may be image difference data, and output data of the inversion model may be production line parameter.

The management platform calculates a mean value of the control parameter and the second parameter to form the first parameter.

In a possible implementation, the sensing network sub-platforms zoom and rotate the first feature information to be fully aligned with the baseline feature information, and record data corresponding to the zooming and rotation as processing data.

The sensing network sub-platforms correct the first image data to form the second image data according to the processing data.

In a possible implementation, the management platform takes the image data at an upstream of the production line in the adjacent second image data as upstream image data, and image data at a downstream of the production line in the adjacent second image data as downstream image data.

The management platform obtains edge data in the upstream image data as upper edge data, and obtain the edge data in the downstream image data as lower edge data; filter out an edge that does not exist in the upper edge data from the lower edge data as a difference edge.

The management platform selects a pixel whose a pixel value difference with pixel value of the upstream image data is greater than a preset value from the downstream image data as a preselected pixel, and filter out a pixel related to the difference edge from the preselected pixel to form the first image difference data; the pixel related to the difference edge refers to the pixel located within a closed difference edge or between the difference edge and a graphic boundary.

Figure 3:
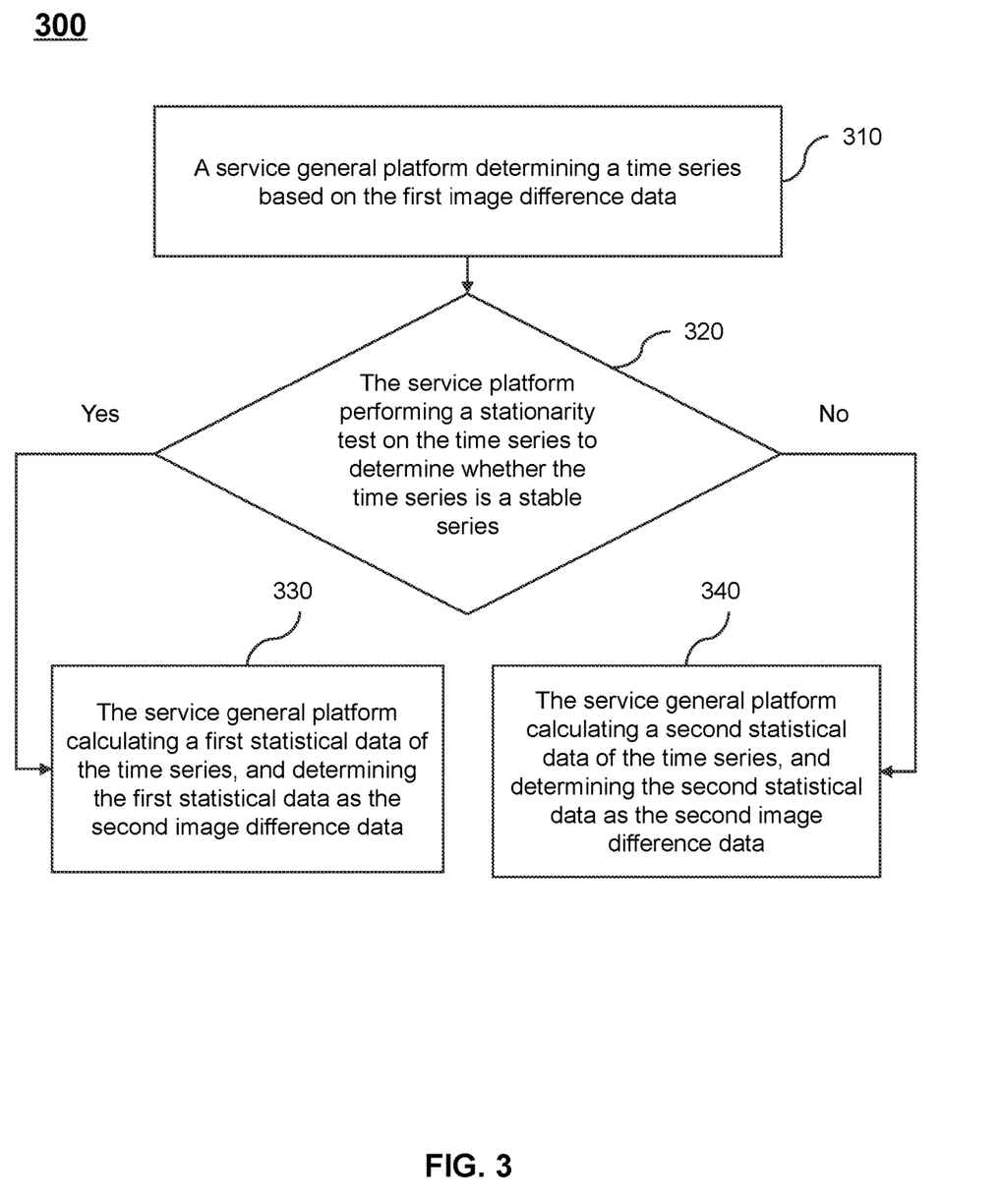
FIG. 3 is an exemplary flowchart illustrating a determining a second image difference data based on a first image difference data according to some embodiments of the present disclosure.

FIG. 3 is an exemplary flowchart illustrating the determining second image difference data based on the first image difference data according to some embodiments of the present disclosure. In some embodiments, a flow 300 may be performed by a service general platform. As shown in FIG. 3, the flow 300 includes the following operations.

In 310, a service general platform determining a time series based on the first image difference data.

The time series may refer to a series of generation time of each product arranged according to the order of time. For example, the time series may be {$x_t$}, {$y_t$}, etc. The generation time may refer to a time point of each product at the end of the corresponding process operation. When there is a plurality of process operations, the time point at the end of each process operation corresponds to a generation time. For example, the first image difference data 1 is the difference between the image 1d after the correction obtained by photographing the product 1 at the time point 1 through the process operation d and of the image 1e after the correction obtained by photographing the product 1 at the time point 2 through the process operation e. The generation time of the process operation e corresponding to the product 1 may be the time point 2. The time point in the time series corresponding to the first image difference data 1 may be the time point 2. As there is no process operation before the first process operation in the production line, there is no corresponding first image difference data at the time point of the end of the first process operation. The generation time does not include the time point at the end of the first process operation.

In some embodiments, the time series may reflect a plurality of first image difference data corresponding to a plurality of different time points arranged in the order of time, for example, the first image difference data of the same product through different process operations at different time points, for another example, the first image difference data of different products through the same process operation at different time points.

In some embodiments, the first image difference data sent by the service sub-platforms to the service general platform may include the generation time of each product. The service general platform may arrange the plurality of first image difference data in the order of time according to the generation time of each product, and then determine the time series corresponding to the plurality of first image difference data. The service general platform may set a length of a time period of the time series according to actual needs, for example, the time period may be 30 minutes, 1 hour, 24 hours, 72 hours, etc. The service general platform may update the time period of the time series continuously. For example, the time series may be the time series corresponding to the plurality of first image difference data within 24 hours from the current time point.

In 320, the service platform performing a stationarity test on the time series to determine whether the time series is a stable series.

The stable series may refer to a series where the first image difference data in the time series basically has little change trend with time. For example, the changes of the plurality of first image difference data at different time points basically fluctuate up and down within a certain range. A mean value, variance, and covariance of the plurality of first image difference data corresponding to the stable series does not change with time.

In some embodiments, the service general platform may perform a stationarity test on the time series through a plurality of approaches (such as a graphic analysis, an assumption testing approach, etc.). For example, the service general platform may draw a line chart of a relationship between the first image difference data and the time according to the time series. The service general platform may determine whether the time series is stable through the line chart. The line chart may reflect the changes of the plurality of first image difference data at different time points. For example, when the line in the line chart fluctuates up and down at a certain value with the same fluctuation amplitude, the service general platform may determine that the time series is a stable series. For example, when the line in the line chart rises or decreases with time change, etc., the service general platform may determine that the time series is a non-stable series. The non-stable series may refer to a series where the first image difference data has features of trend, periodicity, and contingency, etc with time change.

For another example, the service general platform may perform the stationarity test on the time series through a Dickey-Fuller Test and an Augmented Dickey-Fuller Test (ADF test). When the assumed value (P-Value) determined by the ADF test is less than a preset confidence, the service general platform may determine that the time series is a stable series. When the assumed value (P-Value) determined by the ADF test is greater than the preset confidence, the service general platform may determine that the time series is not a stable series, i.e., a non-stable series. The preset confidence may be a preset maximum confidence of the assumed value. For example, the preset confidence may be 10%, 5%, 1%, etc.

In 330, in response to a determination that the time series is a stable series, the service general platform calculating a first statistical data of the time series, and determining the first statistical data as the second image difference data.

The first statistical data may refer to a statistical amount of the plurality of first image difference data corresponding to the stable time series. In some embodiments, the first statistical data may be represented in various ways. The first statistical data may include at least one of a sample moment and an autocovariance. The sample moment may include a k-order sample origin moment, a k-order sample central moment, etc. The autocovariance may include a k-order autocovariance, etc.

In some embodiments, the service general platform may calculate the first statistical data of the time series in various ways. For example, the service general platform may calculate the k-order sample origin moment of the time series through the formula (1):

$$\overline{\alpha}_k = \frac{1}{n}\sum_{i=1}^{n} X_i^k \qquad (1)$$

where $\alpha_k$ denotes the k-order sample origin moment of the time series; n denotes a number of samples of the time series; and $X_i^k$ denotes the k-order sample origin moment of the ith sample.

For another example, the service general platform may calculate the k-order sample central moment of the time series through the formula (2):

$$\overline{\beta}_k = \frac{1}{n}\sum_{i=1}^{n}(X_i - \overline{X})^k \qquad (2)$$

where $\overline{\beta}_k$ denotes the k-order autocovariance of the time series; n denotes the number of samples of the time series; $X_i$ denotes the first image difference data of the ith sample; and $\overline{X}$ denotes a mean value of the first image difference data of the n samples.

For another example, the service general platform may calculate the k-order autocovariance through formula (3) and formulas (4):

$$\gamma_k = \text{Cov}(y_t, y_{t+k}) = E[(y_t-\mu)(y_{t+k}-\mu)] \qquad (3)$$

$$\mu = E(y) \quad (4)$$

where $\gamma_k$ denotes the k-order autocovariance of the time series $y_t$, which reflects a degree of autocorrelation between a same variable $y_t$ and a variable of interval k period; $\mu = E(y)$ indicates a general mean value, and E indicates an expected value.

In some embodiments, the service general platform may determine the first statistical data (such as the k-order sample origin moment, the k-order sample central moment, and the k-order autocovariance, etc.) obtained through the above ways as the second image difference data.

In 340, in response to a determination that the time series is not a stable series, the service general platform calculating a second statistical data of the time series, and determining the second statistical data as the second image difference data.

The second statistical data may refer to a statistical amount of the plurality of first image difference data corresponding to all or a portion of the non-stable series. In some embodiments, the second statistical data may be represented in various ways. The second statistical data includes at least one of a sample moment and an autocovariance.

In some embodiments, when the time series is a non-stable series, the service general platform may further determine the time period corresponding to the non-stable series in the time series. The time series may be divided into a first time period corresponding to the stable series and a second time period corresponding to the non-stable series. Through the approach of determining the first statistical data in 330, the service general platform may respectively determine second statistical data 1 corresponding to the first time period and second statistical data 2 corresponding to the second time period. The service general platform may determine the second statistical data 1 and the second statistical data 2 as the second image difference data.

In some embodiments, when the time series is a non-stable series, the service general platform may segment the time series and obtain at least one segmented time series. The service general platform may determine at least one second statistical data based on the at least one segmented time series. The service general platform may integrate the at least one second statistical data to determine the second image difference data.

The segmented time series may include the time series corresponding to at least one time period.

In some embodiments, the service general platform may segment the time series in various ways. For example, the service general platform may segment the time series randomly. For another example, the service general platform may segment the time series according to a preset rule. The preset rule may specify a number of the segment, a principle of the segment (such as average segment, etc.), the minimum time length of a segment, etc.

In some embodiments, after the first segment, at least one segmented time series may include the stable series and the non-stable series. For the at least one segmented time series, the service platform may repeat operation 320 to determine whether the at least one segmented time series is a stable series. When a certain segmented time series is the stable series, the segmented time series may not be further segmented. When a certain segmented time series is the non-stable series, the service general platform may continue to perform a second segment. The service general platform may continue to repeat operation 320 to re-determine whether the at least one second segmented time series is the stable series. The service general platform stops segmenting until the at least one segmented time series is a stable series. The service general platform obtains at least one final segmented time series corresponding to the time series.

In some embodiments, when the segmented time series is less than a time series threshold, the service general platform stops further segmenting the segmented time series. The time series threshold may refer to the minimum value of the time series. The service general platform may preset the time series threshold in advance. When the segmented time series less than the time series threshold is a non-stable series, the service general platform may label the segmented time series to distinguish the segmented time series from other segmented time series being stable series so as to facilitate the subsequent separate statistics of the segmented time series of stable series and the segmented time series of non-stable series.

Each segmented time series may correspond to a second statistical data. The service general platform may respectively determine at least one second statistical data corresponding to at least one segmented time series based on at least one segmented time series. The determining at least one second statistical data based on the at least one segmented time series may be referred to the operation 330, for example, the service general platform calculates the first statistical data of the time series in operation 330, the service general platform may calculate the second statistical data corresponding to each segmented time series according to operation 330. Through the calculation, the service general platform may determine a plurality of second statistical data corresponding to the plurality of segmented time series.

In some embodiments, the service general platform may integrate (such as weighting or averaging) the plurality of second statistical data respectively corresponding to the plurality of segmented time series to determine the second image difference data. When the plurality of segmented time series include non-stable series, the service general platform may integrate the plurality of second statistical data corresponding to the stable series to determine the second image difference data corresponding to the stable series. The service general platform may stitch the second statistical data corresponding to the stable series and the second statistical data corresponding to the non-stable series to determine final second image difference data.

In some embodiments of the present disclosure, when the time series is a non-stable series, the service general platform may segment the time series. The service general platform determining the plurality of second statistical data respectively corresponding to the plurality of segmented stable series may further improve the accuracy of the final determined second image difference data, which helps to realize more accurately adjustment of subsequent production line parameter.

In some embodiments of the present disclosure, the service general platform may determine the calculated statistical data of the time series of the first image difference data as the second image difference data. In this way, the accuracy of the final determined second image difference data may be improved, which helps to realize more accurately adjustment of subsequent production line parameter.

Figure 4:
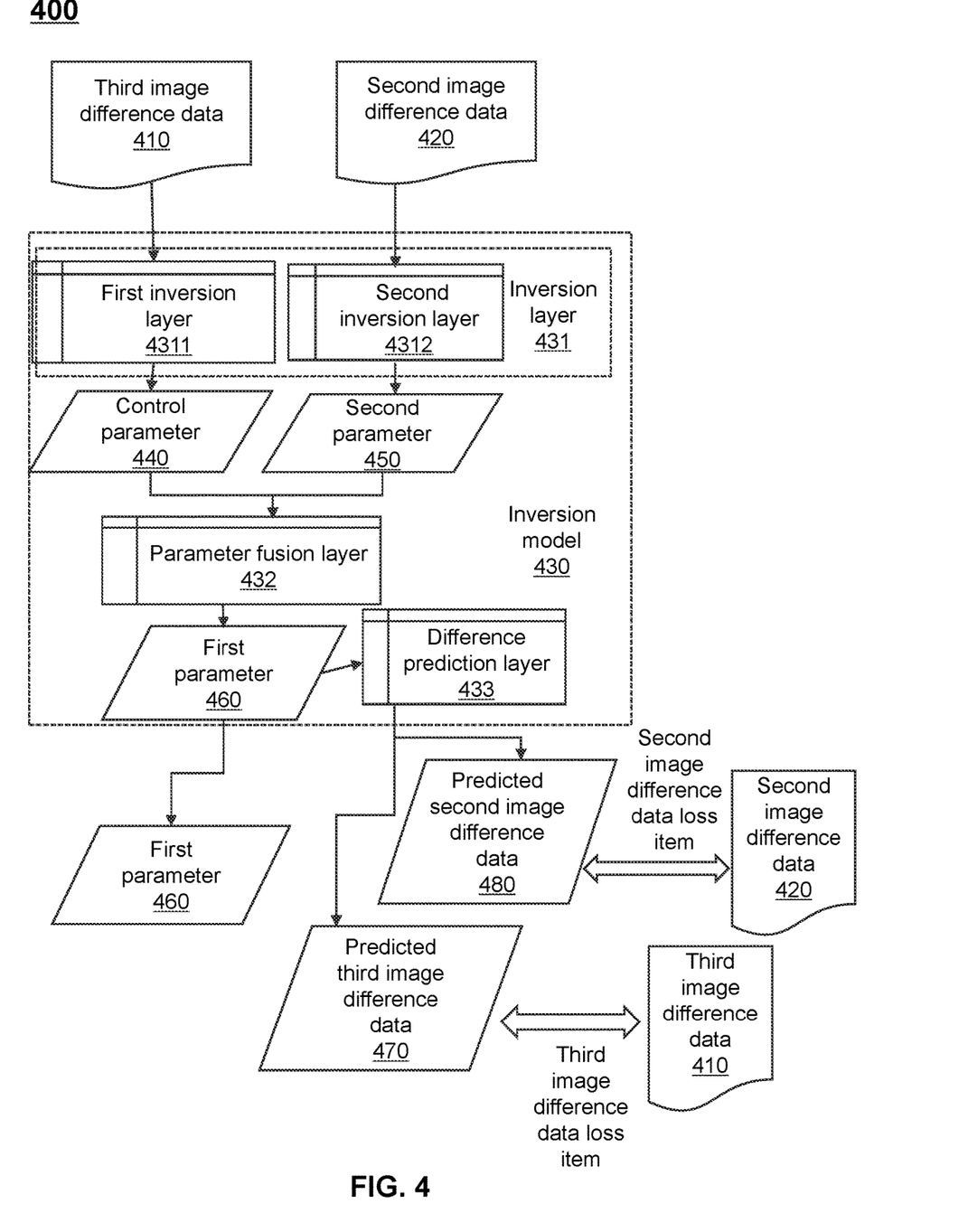
FIG. 4 is a schematic diagram illustrating determining a first parameter based on an inversion model according to some embodiments of the present disclosure.

FIG. 4 is a schematic diagram illustrating a determining a first parameter based on an inversion model according to some embodiments of the present disclosure. In some embodiments, a flow 400 may be performed by the management platform.

In some embodiments, the inversion model 430 may include at least one of an inversion layer 431, a parameter fusion layer 432, and a difference prediction layer 433. The inversion model may be a machine learning model.

The inversion layer may be used to process image difference data to determine a production line parameter. The inversion layer 431 may include a first inversion layer 4311, and a second inversion layer 4312, etc. In some embodiments, different inversion layers may process different image difference data to generate different production line parameters. For example, the management platform may process third image difference data 410 based on the first inversion layer 4311 to generate a control parameter 440. Exemplarily, an input of the first inversion layer 4311 may be the third image difference data 410, and an output of the first inversion layer 4311 may be the control parameter 440. For another example, the management platform may process second image difference data 420 based on the second inversion layer 4312 to generate a second parameter 450. Exemplarily, the input of the second inversion layer 4312 may be the second image difference data 420, and the output of the second inversion layer 4312 may be the second parameter 450. For more descriptions of the third image difference data, the control parameter, and the second parameter, please refer to related descriptions of FIG. 1 and FIG. 2.

The parameter fusion layer 432 may be configured to fuse different production line parameters to determine the first parameter. In some embodiments, the management platform may fuse the control parameter and the second parameter based on the parameter fusion layer to determine the first parameter. For example, the input of the parameter fusion layer 432 may be the control parameter 440 and the second parameter 450, and the output of the parameter fusion layer 432 may be the first parameter 460. For more descriptions of the first parameter, please refer to the related descriptions of FIG. 1 and FIG. 2.

In some embodiments, the management platform may determine the first parameter based on a fusion weight of the control parameter and the second parameter in the parameter fusion layer. The fusion weight of the control parameter and the second parameter in the parameter fusion layer may be related to an average proportion of preselected pixels in downstream image data. For more descriptions of the preselected pixels and downstream image data, please refer to related descriptions of FIG. 1 and FIG. 2.

The fusion weight may refer to weight coefficients respectively corresponding to the control parameter and the second parameter during the fusion.

A preselected pixel corresponds to a proportion of downstream image data. The proportion may refer to a ratio of a number of preselected pixels to a total number of pixels in the downstream image data. The management platform may obtain the corresponding proportions of a plurality of preselected pixels in a plurality of downstream image data. The management platform may determine the average proportion of preselected pixels in downstream image data by averaging.

In some embodiments, the fusion weight corresponding to the control parameter may be proportional to the average proportion of the preselected pixels in the downstream image data. The fusion weight corresponding to the second parameter may be inversely proportional to the average proportion of the preselected pixels in the downstream image data. The average proportion of the preselected pixels in the downstream image data is large, indicating that the first image data difference of the product is great, a processing intensity of the corresponding process operations on the production line may be relatively large, and the product may change more significantly after the process operations. As a result, an acceptability of the difference between the corresponding second image difference data may be high, and the fusion weight corresponding to the second parameter determined by the second image difference data may be reduced.

In some embodiments of the present disclosure, determining the fusion weight through the average proportion of preselected pixels in the downstream image data may further improve the accuracy of the first parameter determined by the parameter fusion layer.

The difference prediction layer 433 may be configured to predict the image difference data based on a first parameter. In some embodiments, the management platform may process the first parameter based on the difference prediction layer to obtain a predicted third image difference data and/or a predicted second image difference data. The input of the difference prediction layer 433 may include the first parameter 460, and the output of the difference prediction layer 433 may include the predicted third image difference data 470 and/or the predicted second image difference data 480. The predicted third image difference data may refer to difference data between the first image difference data and baseline image difference data predicted by the difference prediction layer based on the first parameter. The predicted second image difference data may refer to difference data in the first image difference data of different products predicted by the difference prediction layer based on the first parameter.

In some embodiments, when determining the first parameter based on the inversion model, the third image difference data 410 and the second image difference data 420 may be input to the inversion model. In the inversion model, the management platform may input the third image difference data 410 into the first inversion layer 4311. The control parameter 440 output by the first inversion layer 4311 may be used as the input of the parameter fusion layer 432. In the inversion model, the management platform may input the second image difference data 420 to the second inversion layer 4312. The second parameter 450 output by the second inversion layer 4312 may be used as the input of the parameter fusion layer 432. In the inversion model, the management platform may input the control parameter 440 and the second parameter 450 to the parameter fusion layer 432. The first parameter 460 output by the parameter fusion layer 432 may be used as the output of the inversion model 430. The inversion layer, the parameter fusion layer, and the difference prediction layer may be a neural network or a structure of other machine learning models, the implementation approaches and structures of which may be different.

The inversion model may be obtained through training. The difference prediction layer in the inversion model may be obtained by pre-training based on a training sample, and may be optimized when the inversion layer and the parameter fusion layer are jointly trained. During the pre-training of the difference prediction layer, the training sample may include a historical first parameter. The training sample may be obtained based on historical data. A label may be historical third image difference data and historical second image difference data corresponding to a historical first parameter.

The inversion layer and the parameter fusion layer in the inversion model may be obtained by jointly training with the pre-trained difference prediction layer.

During the training, the input of the inversion layer may come from the third image difference data and the second image difference data in actual historical data. The sample label may be an actual control parameter and the actual second parameter in the historical data. During the training, the input of the parameter fusion layer may come from the actual control parameter and the actual second parameter in the historical data. The sample label may be the actual first parameter in the historical data. Thus, the management platform may train a model to obtain the first parameter corresponding to a target condition based on a law among the types of data. In this way, a complex calculation and uncertainty of a trial calculation through a plurality of sets of preset parameters may be reduced.

During the training, a loss function may include a loss item related to the predicted first parameter, a loss item of the third image difference data based on a first compliance rate of the difference data, and a loss item of the second image difference data based on a second compliance rate of the difference data. The joint training may be performed in various feasible approaches, such as gradient descent.

The first compliance rate of the difference data may refer to the degree of compliance between the predicted third image difference data and the third image difference data. For example, the first compliance rate of the difference data may be determined based on a difference between the predicted third image difference data and the third image difference data. Exemplarily, the first compliance rate of the difference data may be inversely proportional to the difference between the predicted third image difference data and the third image difference data. The smaller the difference between the predicted third image difference data and the third image difference data is, the greater the first compliance rate of the difference data is.

The second compliance rate of the difference data may refer to the degree of compliance between the predicted second image difference data and the second image difference data. For example, the second compliance rate of the difference data may be determined based on the difference between the predicted second image difference data and the second image difference data. Exemplarily, the second compliance rate of the difference data may be inversely proportional to the difference between the predicted second image difference data and the second image difference data. The smaller the difference between the predicted second image difference data and the second image difference data is, the greater the second compliance rate of the difference data is.

Through the above model, the first parameter that meets a requirement may be predicted based on experience learned from the historical data. The model may predict the image difference data that may be actually obtained based on the obtained first parameter. With the combination of the loss function, the model may make the actual image difference data closer or better than the image difference data.

The inversion model provided by some embodiments of the present disclosure may determine the first parameter, and input the determined first parameter to the difference prediction layer to obtain the predicted third image difference data and the predicted second image difference. In this way, a more ideal first parameter may be obtained, which improves the accuracy of the inversion model, and helps to improving accuracy of the intelligent manufacturing control.

Those skilled in the art may realize that the units and algorithms described in the embodiments of the present disclosure may be implemented through an electronic hardware, a computer software, or the combination thereof. To clearly explain the interchangeability of the hardware and the software, the above has described the composition and operation of each embodiment in general. Whether these functions are implemented by the hardware or the software depends on the specific application and design constraints of the technical solution. Those skilled in the art may use different approaches to implement the described functions on each specific application, but this implementation should not be considered to exceed the scope of the present disclosure.

In several embodiments provided by the present disclosure, it should be understood that the device and method disclosed should be implemented in other ways. For example, the embodiment of the device described above is only for the purpose of illustration. For example, the division of the unit is only one kind of logical function division. In practice, there may be another way to divide. For example, a plurality of units or components may be combined or integrated to another system, or some features may be ignored or not executed. In addition, the shown or discussed mutual coupling or direct coupling or communication connection may be indirect coupling or communication connection through some interfaces, devices, or units, or may be electrical, mechanical, or other forms of connection.

The units that are described as a separate part may be separated physically or not. As a unit, it is obvious for those skilled in the art that the units and algorithms described in the embodiments of the present disclosure may be implemented through an electronic hardware, a computer software, or the combination thereof. To clearly explain the interchangeability of the hardware and the software, the above has described the composition and operation of each embodiment in general. Whether these functions are implemented by the hardware or the software depends on the specific application and design constraints of the technical solution. Those skilled in the art may use different approaches to implement the described functions on each specific application, but this implementation should not be considered to exceed the scope of the present disclosure.

In addition, each functional unit in each embodiment of the present disclosure may be integrated in one processing unit, or they may physically exist independently, or two or more units may be integrated in one unit. The above integrated units may be implemented in the form of hardware or the form of software functional units.

When the integrated unit is implemented in the form of a software functional unit or used or sold as an independent product, it may be stored in a computer readable storage medium. Based on this understanding, the technical solution of the present disclosure is essentially or the part that contributes to the prior art, or all or part of the technical solution can be embodied in the form of a software product, and the computer software product is stored in a storage medium, including several instructions used to make a computer device (which may be a personal computer, a server, or a grid device, etc.) to execute all or part of the operations of the methods described in the various embodiments of the present disclosure. The aforementioned storage medium includes: a U disk, a removable hard disk, a Read-Only Memory (ROM, Read-Only Memory), a Random Access Memory (RAM, Random Access Memory), a magnetic disk or optical disk and other media that can store program codes.

The specific embodiments described above further describe the purpose, technical solutions, and beneficial effects of the present disclosure in detail. It should be understood that the above descriptions are only specific embodiments of the present disclosure, and are not intended to limit the scope of the present disclosure. The protection scope, any modification, equivalent replacement, improvement, etc. made within the spirit and principle of the present disclosure shall be included in the protection scope of the present disclosure.

What is claimed is:

1. An Internet of Things (IoT) system for industrial data processing, including: a service platform, a management platform, and a sensing network platform that interact in turn, wherein the sensing network platform includes a sensing network general platform and a plurality of sensing network sub-platforms; wherein:

the sensing network sub-platforms are configured to:
receive image information of a product when a process operation of a production line ends as a first image data; each of the sensing network sub-platforms receiving the first image data corresponding to different process operation;
identify first feature information of the first image data, and correct, according to the first feature information and baseline feature information, the first image data to form second image data;
send the second image data to the sensing network general platform;

the sensing network general platform is configured to:
receive the second image data, and sort the second image data according to the process operation of the production line to form a first image database;
send the first image database to the management platform;

the service platform is configured to:
calculate a difference of corresponding data in a first image difference data of different products as a second image difference data, including:
determining a time series based on the first image difference data, wherein the time series is a series of generation time of each product arranged in an order of time;
performing a stationarity test on the time series;
calculating a statistical data of the time series based on a result of the stationarity test;
determining the second image difference data; and
sending the second image difference data to the management platform;

the management platform is configured to:
identify a difference between adjacent second image data in the first image database as the first image difference data;
generate, according to the first image difference data, a control parameter of a production line device, and correct the control parameter as a first parameter, and issue the first parameter to the production line device through the sensing network platform; and
send the first image database and the first image difference data to the user platform for display through the service platform.

2. The IoT system of claim 1, wherein the service platform includes a service general platform and a plurality of service sub-platforms, wherein:

the service sub-platforms are configured to:
receive the first image difference data; each service sub-platform receiving the first image difference data corresponding to different products of a same production line;
transmit all the first image difference data to the service general platform;
the service general platform is configured to:

calculate the difference of the corresponding data in the first image difference data of the different products as the second image difference data; and
send the second image difference data to the management platform, the management platform correcting, according to the second image difference data, the control parameter to form the first parameter.

3. The IoT system of claim 2, wherein the service general platform is further configured to:
perform the stationarity test on the time series to determine whether the time series is a stable series;
in response to a determination that the time series is a stable series, calculate a first statistical data of the time series, and determine the first statistical data as the second image difference data, wherein the first statistical data is a statistical amount of the plurality of first image difference data corresponding to the stable time series; and
in response to a determination that the time series is not the stable series, calculate a second statistical data of the time series, and determine the second statistical data as the second image difference data, wherein the second statistical data is a statistical amount of the plurality of first image difference data corresponding to all or a portion of the non-stable series.

4. The IoT system of claim 3, wherein the service general platform is further configured to:
segment the time series and obtain at least one segmented time series;
determine, based on the at least one segmented time series, at least one second statistical data, wherein the at least one second statistical data is the at least one second statistical data corresponding to each segmented time series of the at least one segmented time series; and
integrate the at least one second statistical data to determine the second image difference data.

5. The IoT system of claim 2, wherein the management platform is further configured to:
compare the first image difference data and baseline image difference data configured on the management platform to generate a third image difference data;
input the third image difference data to an inversion model to generate the control parameter, and input the second image difference data to the inversion model to generate a second parameter; wherein input data of the inversion model is image difference data, and output data of the inversion model is production line parameter; and
calculate a mean value of the control parameter and the second parameter to form the first parameter.

6. The IoT system of claim 5, wherein the inversion model includes at least one of an inversion layer, a parameter fusion layer, and a difference prediction layer, wherein the inversion model is a machine learning model;
the management platform is further configured to:
process, based on the inversion layer, the third image difference data to generate the control parameter, and process, based on the inversion layer, the second image difference data to generate the second parameter;
fuse, based on the parameter fusion layer, the control parameter and the second parameter to determine the first parameter; and process, based on the difference prediction layer, the first parameter to obtain a predicted third image difference data or a predicted second image difference data.

7. The IoT system of claim 6, wherein
a fusion weight of the control parameter and the second parameter in the parameter fusion layer is related to an average proportion of preselected pixels in downstream image data.

8. The IoT system of claim 1, wherein the management platform is further configured to:
  take image data at an upstream of the production line in the adjacent second image data as upstream image data, and image data at a downstream of the production line in the adjacent second image data as downstream image data;
  obtain edge data in the upstream image data as upper edge data, and obtain the edge data in the downstream image data as lower edge data; filter out an edge that does not exist in the upper edge data from the lower edge data as a difference edge; and
  select, from the downstream image data, a pixel whose a pixel value difference with pixel value of the upstream image data is greater than a preset value as a preselected pixel, and filter out, from the preselected pixel, a pixel related to the difference edge to form the first image difference data; wherein the pixel related to the difference edge refers to the pixel located within a closed difference edge or between the difference edge and a graphic boundary.

9. A control method of an industrial Internet of Things (IoT) for industrial data processing, which is used in a service platform, a management platform, and a sensing network platform that interact in turn, wherein the sensing network platform includes a sensing network general platform and a plurality of sensing network sub-platforms;
  the method comprising:
    the sensing network sub-platforms receiving image information of a product when a process operation of a production line ends as a first image data; each of the sensing network sub-platforms receiving the first image data corresponding to different process operation;
    the sensing network sub-platforms identifying first feature information of the first image data, and correcting, according to the first feature information and baseline feature information, the first image data to form second image data;
    the sensing network sub-platforms sending the second image data to the sensing network general platform;
    the sensing network general platform receiving the second image data, and sorting the second image data according to the process operation of the production line to form a first image database;
    the sensing network general platform sending the first image database to the management platform;
    the service platform calculating a difference of corresponding data in a first image difference data of different products as a second image difference data, including:
      determining a time series based on the first image difference data, wherein the time series is a series of generation time of each product arranged in an order of time;
      performing a stationarity test on the time series;
      calculating a statistical data of the time series based on a result of the stationarity test;
      determining the second image difference data; and
      sending the second image difference data to the management platform;
    the management platform identifying a difference between adjacent second image data in the first image database as the first image difference data;
    the management platform generating, according to the first image difference data, a control parameter of a production line device, and correcting the control parameter as a first parameter, and issuing the first parameter to the production line device through the sensing network platform; and
    the management platform sending the first image database and the first image difference data to the user platform for display through the service platform.

10. The method of claim 9, wherein the service platform includes a service general platform and a plurality of service sub-platforms;
  the method further comprising:
    the service sub-platforms receiving the first image difference data; each service sub-platform receiving the first image difference data corresponding to different products of a same production line;
    the service sub-platforms transmitting all the first image difference data to the service general-platform;
    the service general-platform calculating the difference of the corresponding data in the first image difference data of the different products as the second image difference data;
    the service general-platform sending the second image difference data to the management platform; and
    the management platform correcting, according to the second image difference data, the control parameter to form the first parameter.

11. The method of claim 10, wherein the service general platform calculating a difference of corresponding data in the first image difference data of different products as a second image difference data comprises:
  the service general platform performing the stationarity test on the time series to determine whether the time series is a stable series;
  in response to a determination that the time series is a stable series, the service general platform calculating a first statistical data of the time series, and determining the first statistical data as the second image difference data, wherein the first statistical data is a statistical amount of the plurality of first image difference data corresponding to the stable time series; and
  in response to a determination that the time series is not the stable series, the service general platform calculating a second statistical data of the time series, and determining the second statistical data as the second image difference data, wherein the second statistical data is a statistical amount of the plurality of first image difference data corresponding to all or a portion of the non-stable series.

12. The method of claim 11, wherein the in response to a determination that the time series is not a stable series, the service general platform calculating a second statistical data of the time series, and determining the second statistical data as the second image difference data comprises:
  the service general platform segmenting the time series and obtain at least one segmented time series;
  the service general platform determining, based on the at least one segmented time series, at least one second statistical data, wherein the at least one second statistical data is the at least one second statistical data corresponding to each segmented time series of the at least one segmented time series; and the service general platform integrating the at least one second statistical data to determine the second image difference data.

13. The method of claim 10, wherein the management platform compares the first image difference data and baseline image difference data configured on the management platform to generate a third image difference data;

the management platform inputs the third image difference data to an inversion model to generate the control parameter, and input the second image difference data to the inversion model to generate a second parameter; wherein input data of the inversion model is image difference data, and output data of the inversion model is production line parameter; and the management platform calculates a mean value of the control parameter and the second parameter to form the first parameter.

14. The method of claim 13, wherein the inversion model includes at least one of an inversion layer, a parameter fusion layer, and a difference prediction layer, wherein the inversion model is a machine learning model;

the method further comprising:

the management platform processing, based on the inversion layer, the third image difference data to generate the control parameter, and processing, based on the inversion layer, the second image difference data to generate the second parameter;

the management platform fusing, based on the parameter fusion layer, the control parameter and the second parameter to determine the first parameter; and the management platform processing, based on the difference prediction layer, the first parameter to obtain a predicted third image difference data or a predicted second image difference data.

15. The method of claim 14, wherein a fusion weight of the control parameter and the second parameter in the parameter fusion layer is related to an average proportion of preselected pixels in downstream image data.

16. The method of claim 9, wherein the management platform takes image data at an upstream of the production line in the adjacent second image data as upstream image data, and image data at a downstream of the production line in the adjacent second image data as downstream image data;

the management platform obtains edge data in the upstream image data as upper edge data, and obtains the edge data in the downstream image data as lower edge data; filters out an edge that does not exist in the upper edge data from the lower edge data as a difference edge; and the management platform selects, from the downstream image data, a pixel whose a pixel value difference with pixel value of the upstream image data is greater than a preset value as a preselected pixel, and filters out, from the preselected pixel, a pixel related to the difference edge to form the first image difference data; wherein the pixel related to the difference edge refers to the pixel located within a closed difference edge or between the difference edge and a graphic boundary.

17. A non-transitory computer-readable storage medium storing computer instructions, wherein when reading the computer instructions in the storage medium, a computer implements the control method of an industrial Internet of Things (IoT) for industrial data processing according to claim 9.

* * * * *